United States Patent
Chang et al.

(10) Patent No.: US 9,608,482 B2
(45) Date of Patent: Mar. 28, 2017

(54) MOTOR STATOR MANUFACTURING METHOD AND STRUCTURE THEREOF

(71) Applicant: Genese Intelligent Technology Co., Ltd., Kaohsiung (TW)

(72) Inventors: Nai-Hsin Chang, Kaohsiung (TW); Jung-Pei Huang, Kaohsiung (TW)

(73) Assignee: Genese Intelligent Technology Co., Ltd., Kaohsiung (TW)

( * ) Notice: Subject to any disclaimer, the term of this patent is extended or adjusted under 35 U.S.C. 154(b) by 0 days.

(21) Appl. No.: 14/266,895

(22) Filed: May 1, 2014

(65) Prior Publication Data

US 2014/0300226 A1    Oct. 9, 2014

Related U.S. Application Data

(63) Continuation-in-part of application No. 13/409,462, filed on Mar. 1, 2012.

(30) Foreign Application Priority Data

Oct. 28, 2011 (TW) ............................. 100220282 U
Jan. 29, 2014 (TW) ............................. 103103394 A

(51) Int. Cl.
*H02K 1/06* (2006.01)
*H02K 3/34* (2006.01)
(Continued)

(52) U.S. Cl.
CPC ............ *H02K 1/148* (2013.01); *H02K 3/522* (2013.01); *H02K 2203/03* (2013.01); *Y10T 29/49009* (2015.01)

(58) Field of Classification Search
CPC ............. H02K 1/28; H02K 1/18; H02K 11/00
(Continued)

(56) References Cited

U.S. PATENT DOCUMENTS 4,115,915 A * 9/1978 Godfrey ......................... 29/596
7,064,470 B2  6/2006 Yokoyama et al.
(Continued)

FOREIGN PATENT DOCUMENTS

JP        09308207 A  * 11/1997
TW        M335869        7/2008

*Primary Examiner* — Jose Gonzalez Quinones
(74) *Attorney, Agent, or Firm* — Alan D. Kamrath; Kamrath IP Lawfirm, P.A.

(57) ABSTRACT

A motor stator manufacturing method includes: prefabricating separate detachable coil sets and coil wire ends thereof; arranging connection points on a printed circuit board on which to assemble or reassemble the separate detachable coil sets; selectively connecting or reconnecting the coil wire ends with the connection points of the printed circuit board to form or change into a predetermined design of various motor stator types; and mounting the separate detachable coil sets in a stator seat to form or change into the AC motor stator type. In another embodiment, the method includes: prefabricating the separate detachable coil sets and coil wire ends thereof; mounting the separate detachable coil sets in the stator seat; arranging the connection points on the printed circuit board and assembling or reassembling the printed circuit board with the separate detachable coil sets; and selectively connecting or reconnecting the coil wire ends with the connection points of the printed circuit board to form or change into the predetermined design of various motor stator types.

8 Claims, 18 Drawing Sheets

(51) Int. Cl.
*H02K 1/14* (2006.01)
*H02K 3/52* (2006.01)

(58) Field of Classification Search
USPC .... 310/216.051, 216.079, 216.086, 216.088,
310/216.091, 216.094, 216.098, 254.1,
310/433
See application file for complete search history.

(56) References Cited

U.S. PATENT DOCUMENTS

| | | |
|---|---|---|
| 7,508,108 B2 | 3/2009 | Makita et al. |
| 7,646,127 B2 | 1/2010 | Fujii et al. |
| 2004/0021393 A1 | 2/2004 | Suzuki et al. |
| 2004/0239200 A1 | 12/2004 | Strahan |
| 2007/0024149 A1 | 2/2007 | Nagata et al. |
| 2008/0143210 A1 | 6/2008 | Wang et al. |
| 2009/0127964 A1* | 5/2009 | Yumoto et al. ............... 310/195 |
| 2009/0315428 A1 | 12/2009 | Chou et al. |
| 2010/0019592 A1 | 1/2010 | Altindis |
| 2010/0141059 A1* | 6/2010 | Nishimura ............... H02K 1/02 310/44 |
| 2011/0241476 A1* | 10/2011 | Burch et al. ................. 310/257 |
| 2012/0119606 A1 | 5/2012 | Chen et al. |

\* cited by examiner

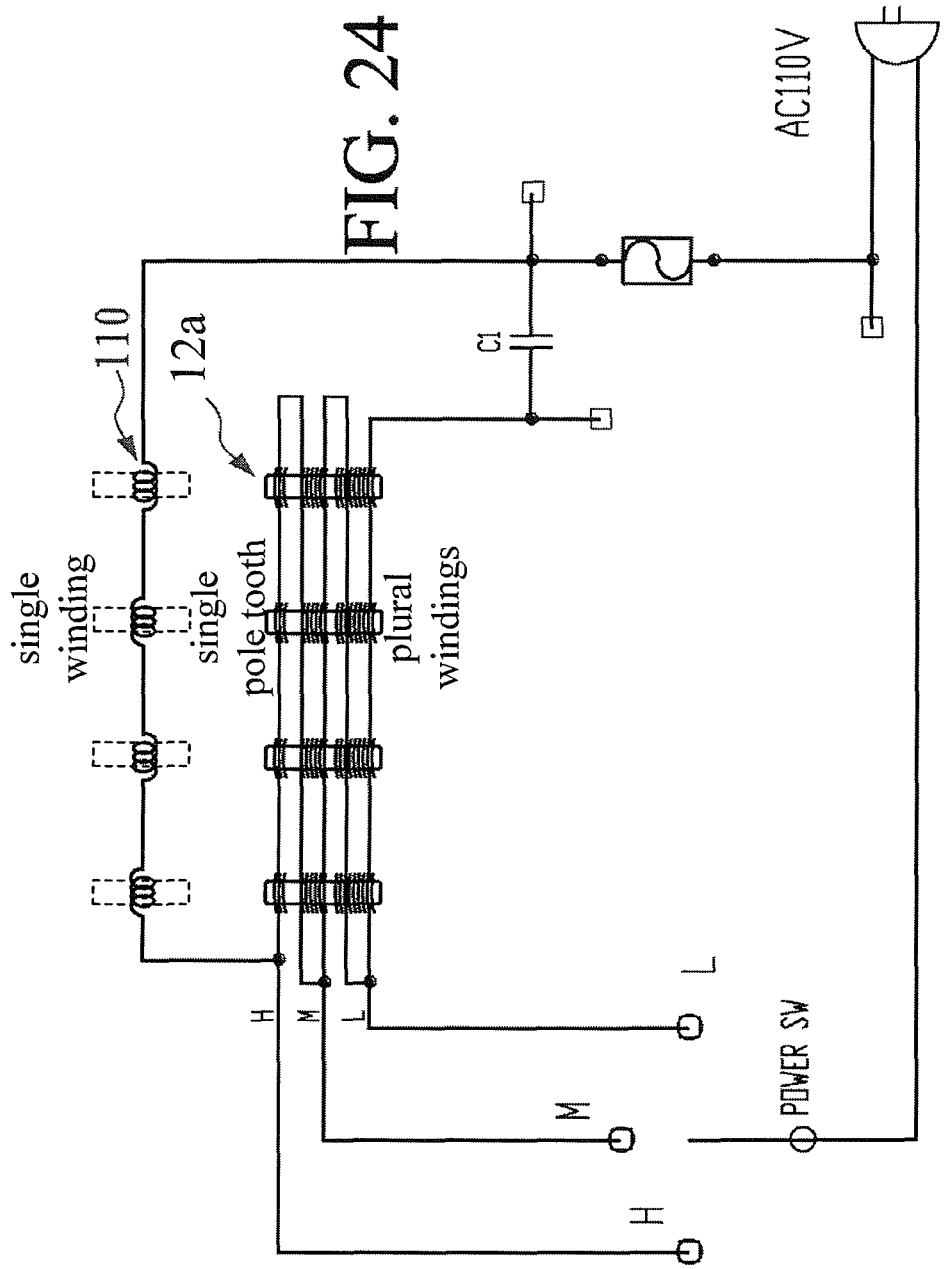

MOTOR STATOR MANUFACTURING METHOD AND STRUCTURE THEREOF

This application is a continuation-in-part of U.S. patent application Ser. No. 13/409,462, filed Mar. 1, 2012, which is hereby incorporated by reference in its entirety.

BACKGROUND OF THE INVENTION

1. Field of the Invention

The present invention relates to a motor stator manufacturing method and structure thereof. Particularly, the present invention relates to an AC motor stator manufacturing method and structure thereof. More particularly, the present invention relates to a motor stator automatically assembling system, an assembly line and an assembling method thereof.

2. Description of the Related Art

US Patent Application Publication No. 20040239200, entitled "Single Phase Synchronous AC Motor," discloses a single phase synchronous AC motor including a laminated iron stator carrying a single phase winding and a permanent magnet rotor located within a stator bore. The stator bore is elongate in shape and is generally symmetrical about a minor axis and a major axis. A permanent magnet reluctance torque smooths out the twice electrical frequency torque pulsation due to the single phase winding. Substantially constant torque is obtained at all rotor positions when a rated load torque is applied. The motor may be designed such that constant torque is achieved for any rate value of load torque corresponding to a fractional value of the permanent magnet reluctance torque. The motor may be designed to obtain a useful ratio of pullout to rated torque for operation from a main AC supply.

However, the stator of the AC motor structure disclosed in US Patent Application Publication No. 20040239200 is only provided to form the single phase winding. The winding type of the stator of the AC motor structure is fixed, such that the AC motor structure cannot be selectively modified to form another type of AC motor according to need.

Another U.S. Pat. No. 7,508,108, entitled "AC Motor," discloses a brushless AC motor having a rotor, N stator pole groups, and plural loop-configuration stator windings. The rotor has magnetic poles with alternating N poles and S poles circumferentially disposed at equal intervals. The stator has plural stator poles divided to the N stator pole groups. Each group is formed circumferentially on the stator with each of adjacent pairs of the groups mutually differing in circumferential position by a desired amount. The stator windings are formed circumferentially on the stator, with each winding disposed immediately adjacent to a corresponding one of the stator pole groups, with respect to a rotor axis direction. As an example, the stator pole has an approximate parallelogram shape in which a top side and a base side of the stator pole in the axis direction of the stator has an approximately same width in rotational direction, and the positions of the top side and the base side is shifted in rotational direction to each other.

However, the AC motor structure disclosed in U.S. Pat. No. 7,508,108 is provided with a three-phase eight-pole stator. There exists a need of individually winding each of the eight poles of the motor stator which may complicate the wire-winding process. Additionally, the winding type of the stator of the AC motor structure is also fixed, such that the AC motor structure cannot be selectively modified to form another type of AC motor according to need.

Taiwanese Patent Application Publication No. 201220649, entitled "Motor stator and assembling method thereof," discloses a motor stator including a stator unit and an auxiliary inductive unit. The stator unit includes a PCB substrate and a plurality of inductive coils which are equispaced apart and embedded in the PCB substrate. The auxiliary inductive unit includes an insulation member, a magnetically conductive member and at least one winding set. The insulation member is arranged on the PCB substrate, and the magnetically-conductive member is arranged on the insulation member. The winding is combined with the magnetically conductive member, the insulation member and the PCB substrate. The winding includes a pillar member and an auxiliary coil wound thereon. The pillar member extends through the magnetically conductive member, the insulation member and the PCB substrate. The pillar member with the coil wound protrudes into the PCB substrate to increase the number of total turns of each coil or the total number of poles deployed on the stator unit, thereby improving the magnetically driving force of the motor stator.

However, the assembling method of the motor stator applied in TW Patent Appl. Pub. No. 201220649 is not an automatically assembling method. Hence, there exists a need of providing an automatically assembling method for the conventional motor stator. The above-mentioned patent is incorporated herein by reference for purposes including, but not limited to, indicating the background of the present invention and illustrating the state of the art.

As is described in greater detail below, the present invention provides a motor stator automatically assembling system and method thereof. A plurality of automatic assembly units and a plurality of conveyer units are provided in an assembly line to automatically assemble and convey motor stator components to form an assembled motor stator in such a way to mitigate and overcome the above problem.

SUMMARY OF THE INVENTION

The primary objective of this invention is to provide a motor stator manufacturing method and structure thereof. An outer stator ring frame and a series of pole tooth units (coil sets) are assembled to form a sectional stator after windings are completely formed on corresponding pole teeth in a wire winding process. After being assembled, wire ends of the pole tooth units selectively connect or reconnect with corresponding connection points to form or to change into a predetermined design of various different motor stator types. Accordingly, the structure of the motor stator is successful in speeding the wire winding operation and in changing to different motor stator types.

The motor stator structure in accordance with an aspect of the present invention includes:
a stator ring frame;
a plurality of separate detachable pole tooth units having pole teeth;
a plurality of windings formed on the corresponding pole teeth prior to being assembled or reassembled;
a plurality of coil wire ends provided on the windings; and
a printed circuit board including a plurality of connection points;
with the stator ring frame and the separate detachable pole tooth units assembled to form a sectional stator. The coil wire ends selectively connect or reconnect with the corresponding connection points to form or change into a predetermined design of various motor stator types.

The AC motor stator structure in accordance with another aspect of the present invention includes:
a stator ring frame;

a primary coil set including first separate detachable pole tooth units;

secondary coil sets including second separate detachable pole tooth units;

a plurality of windings formed on the first separate detachable pole tooth units and the second separate detachable pole tooth unit prior to being assembled or reassembled;

a plurality of coil wire ends provided on the windings; and a printed circuit board including a plurality of connection points;

with the stator ring frame, the first separate detachable pole tooth units and the second separate detachable pole tooth units assembled to form a sectional stator. The coil wire ends selectively connect or reconnect with the corresponding connection points to form or change into a predetermined design of various AC motor stator types.

In a separate aspect of the present invention, the secondary coil set includes a plurality of secondary coils.

In a further separate aspect of the present invention, the stator ring frame has an inner circumferential edge to combine with the separate detachable pole tooth units.

In yet a further separate aspect of the present invention, the coil wire ends include a plurality of primary coil wire ends and a plurality of secondary coil wire ends.

In yet a further separate aspect of the present invention, the coil wire ends include a plurality of starting ends and a plurality of terminal ends.

In yet a further separate aspect of the present invention, a thermal sensor connects between the windings and the printed circuit board.

In yet a further separate aspect of the present invention, the thermal sensor includes a thermal sensing portion and a thermal conductive portion.

The motor stator manufacturing method in accordance with an aspect of the present invention includes the steps of:

prefabricating a plurality of separate detachable coil sets (or pole tooth units) and coil wire ends thereof;

arranging connection points on a printed circuit board on which to assemble or reassemble the separate detachable coil sets;

selectively connecting or reconnecting the coil wire ends with the connection points of the printed circuit board to form or to change into a predetermined design of various motor stator types; and mounting the separate detachable coil sets in a stator seat to form or change into the AC motor stator type.

The motor stator manufacturing method in accordance with another aspect of the present invention includes the steps of:

prefabricating a plurality of separate detachable coil sets (or pole tooth units) and coil wire ends thereof;

mounting the separate detachable coil sets in a stator seat;

arranging connection points on a printed circuit board and assembling or reassembling the printed circuit board with the separate detachable coil sets; and selectively connecting or reconnecting the coil wire ends with the connection points of the printed circuit board to form or to change into a predetermined design of various motor stator types.

In a separate aspect of the present invention, the stator seat has an inner circumferential edge to combine with the separate detachable coil sets.

In a further separate aspect of the present invention, the separate detachable coil sets include a primary coil set and a plurality of secondary coil sets.

In a further separate aspect of the present invention, the secondary coil set includes a plurality of secondary coils.

In yet a further separate aspect of the present invention, the coil wire ends include a plurality of primary coil wire ends and a plurality of secondary coil wire ends.

In yet a further separate aspect of the present invention, the coil wire ends include a plurality of starting ends and a plurality of terminal ends.

Another objective of this invention is to provide a motor stator automatically assembling system and method thereof. A plurality of automatic assembly units and a plurality of conveyer units are connected to form an automatic assembly line along which to automatically assemble motor stator components step by step for forming a semi-assembled motor stator to a completely-assembled motor stator. Accordingly, the motor stator automatically assembling system and method of the present invention are successful in providing an automatically manufacturing process of the motor stator.

The motor stator automatically assembling method in accordance with an aspect of the present invention includes the steps of:

selecting and feeding insulation members by a feeder unit and a vibrator unit;

supplying and arranging the insulation members on a first conveyer unit which conveys the insulation members to a wire-winding unit;

winding at least one wire on the associated insulation member to form wire-wound insulation members by the wire-winding unit;

supplying and arranging the wire-wound insulation members on a second conveyer unit which conveys the wire-wound insulation members to a first assembly unit;

inserting pole teeth into the wire-wound insulation members to form a plurality of compact pole tooth sets by the first assembly unit; and inserting the compact pole tooth sets into a predetermined stator ring frame to form a semi-assembled motor stator by a second assembly unit.

In a separate aspect of the present invention, the motor stator automatically assembling method further includes the step of: prior to selecting and feeding the insulation members, inserting at least one pin in the insulation member by a pin insert unit.

In a further separate aspect of the present invention, the motor stator automatically assembling method further includes the step of: while winding wires on the insulation members, further winding the wires on the associated pin to electrically connect therewith.

In yet a further separate aspect of the present invention, the motor stator automatically assembling method further includes the steps of: moistening the pins of the wire-wound insulation members with solder paste, soldering the pins with the wires, bending the pins to form a bent portion, and executing an impedance or insulation test on the wire-wound insulation members by a first test equipment and combination thereof.

In yet a further separate aspect of the present invention, the pole teeth are provided in a feed magazine to be inserted into the wire-wound insulation members.

In yet a further separate aspect of the present invention, the motor stator automatically assembling method further includes the step of: supplying the stator ring frame to a second assembly unit by a third conveyer unit.

In yet a further separate aspect of the present invention, the motor stator automatically assembling method further includes the step of: rotating the stator ring frame with respect to the second assembly unit by a rotary unit, thereby inserting each of the pole tooth sets into the stator ring frame.

In yet a further separate aspect of the present invention, the motor stator automatically assembling method further includes the steps of: inserting the pins of the semi-assembled motor stator in a printed circuit board, thereby combining the semi-assembled motor stator with the printed circuit board to form a complete-assembled motor stator, and further bending the pins, moistening the pins with solder paste and soldering the pins with the printed circuit board.

In yet a further separate aspect of the present invention, the motor stator automatically assembling method further includes the step of: punching at least one surface of the semi-assembled motor stator to form at least one recession which is formed to combine the pole teeth with each other or to combine the pole tooth sets with the stator ring frame to reinforce the structure of the semi-assembled motor stator.

In yet a further separate aspect of the present invention, the motor stator automatically assembling method further includes the steps of: executing a power test, a resistance test, a dielectric withstand voltage test, an insulation shock test or a load test on the complete-assembled motor stator by a second test equipment.

In yet a further separate aspect of the present invention, the motor stator automatically assembling method further includes the step of: executing a power test, a resistance test, a dielectric withstand voltage test, an insulation shock test or a load test on the complete-assembled motor stator by second test equipment.

The motor stator automatically assembling system in accordance with another aspect of the present invention includes:

a feeder unit provided to feed a plurality of insulation members;

a first conveyer unit connecting to the feeder unit to receive the insulation members therefrom, with the first conveyer unit operated to arrange the insulation members thereon and to convey the insulation members from the feeder unit;

a wire-winding unit connecting to the first conveyer unit to receive the insulation members therefrom, with the wire-winding unit operated to wind wires on the insulation members to form a plurality of wire-wound insulation members;

a second conveyer unit connecting to the wire-winding unit to receive the wire-wound insulation members therefrom, with the second conveyer unit operated to arrange the wire-wound insulation members thereon and to convey the wire-wound insulation members from the wire-winding unit;

a first assembly unit connecting to the second conveyer unit to receive the wire-wound insulation members therefrom, with the first assembly unit operated to insert pole teeth into the wire-wound insulation members to form a plurality of compact pole tooth sets; and a second assembly unit operated to insert the compact pole tooth sets into a predetermined stator ring frame to form a semi-assembled motor stator.

In a separate aspect of the present invention, the feeder unit further includes a vibrator unit which is operated to select the insulation members prior to feeding.

In a further separate aspect of the present invention, further including a pin insert unit which is operated to insert at least one pin in the insulation member.

In yet a further separate aspect of the present invention, a third conveyer unit is connected between the first assembly unit and the second assembly unit, with the third conveyer unit operated to convey the compact pole tooth sets to the second assembly unit.

In yet a further separate aspect of the present invention, a fourth conveyer unit is operated to convey the stator ring frame to the second assembly unit.

In yet a further separate aspect of the present invention, a soldering unit is operated to solder the pins to form a plurality of coil sets.

In yet a further separate aspect of the present invention, a first test equipment unit is operated to execute an impedance or insulation test on the wire-wound insulation members.

In yet a further separate aspect of the present invention, a second test equipment unit is operated to execute a power test, a resistance test, a dielectric withstand voltage test, an insulation shock test or a load test on the complete-assembled motor stator.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 24 is a schematic circuitry view of the primary coil set and the secondary coil set applied in the motor stator in accordance with the present invention.

DETAILED DESCRIPTION OF THE INVENTION

It is noted that a motor stator automatically assembling system and method in accordance with the preferred embodiment of the present invention are suitable for assembling and testing various motor stator steps, for example: inner or outer stator assembling steps, which are not limitative of the present invention. The motor stator automatically assembling system and method in accordance with the preferred embodiment of the present invention are suitably implemented by utilizing various automatic apparatus, for example: auto pin insert machines, auto conveyers, auto wire-winding machines, auto punch machines, auto testing equipment and combinations thereof, which are not limitative of the present invention.

Figure 1:
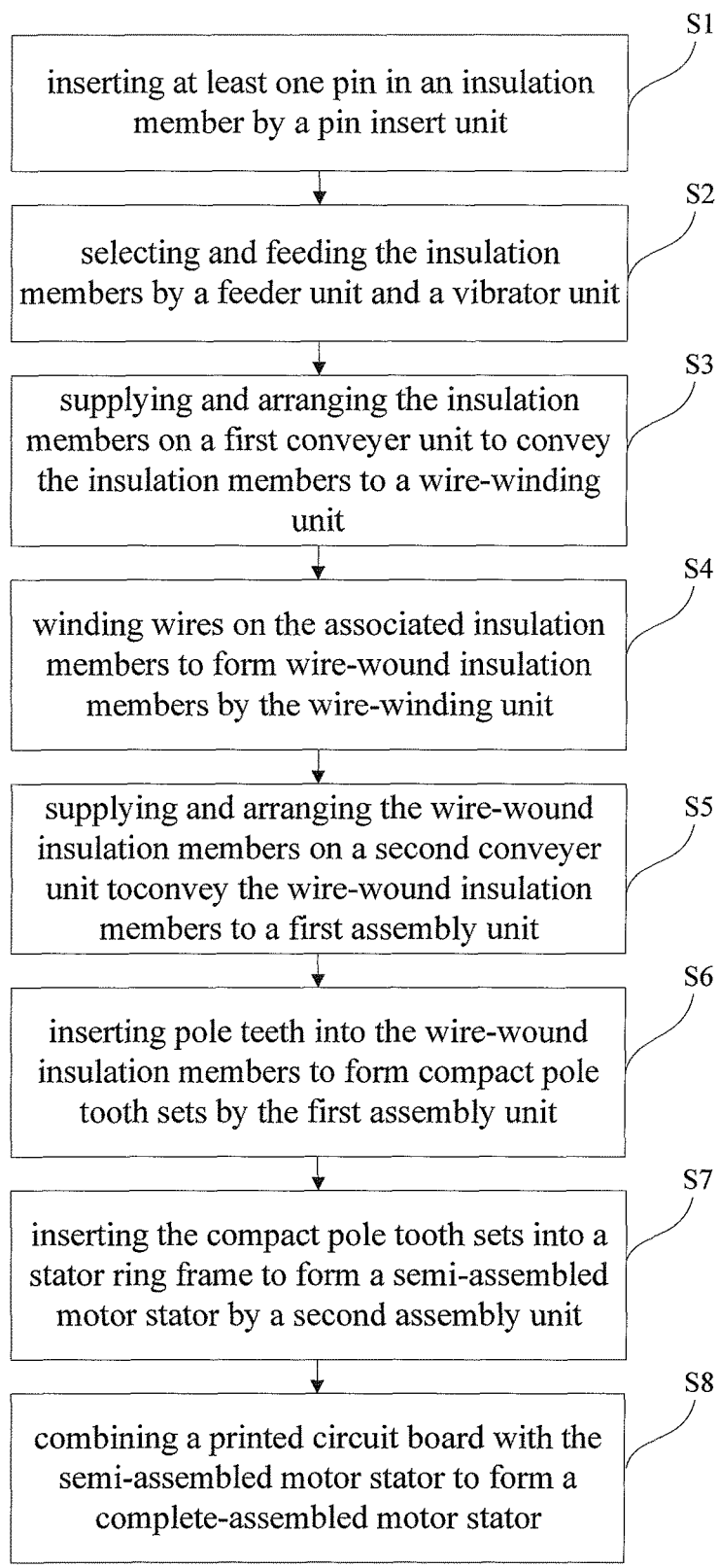
FIG. 1 is a flow chart of a motor stator automatically assembling method in accordance with a preferred embodiment of the present invention.
Figure 1A:
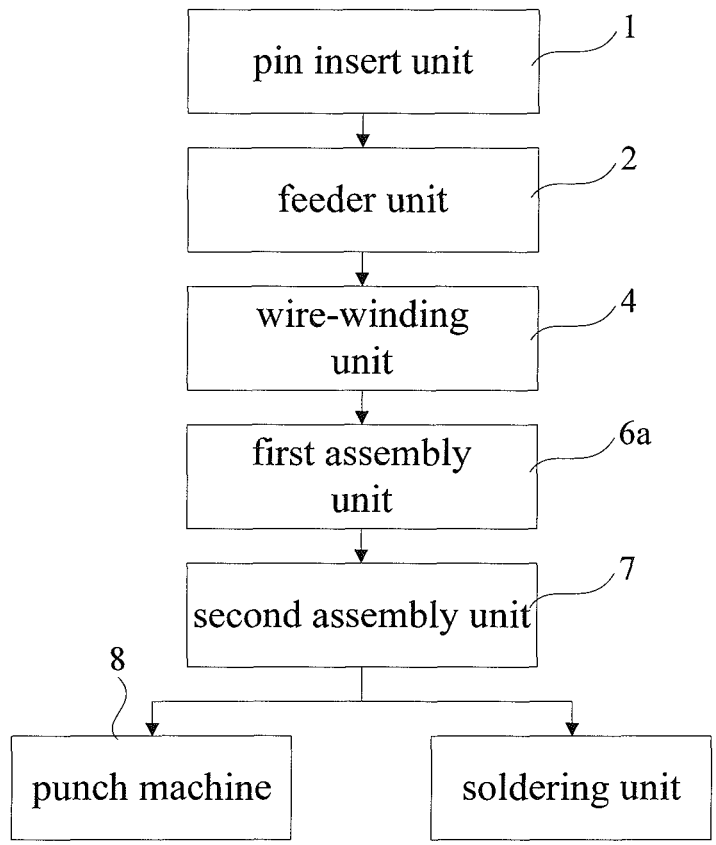
FIG. 1A is a block diagram of a motor stator automatically assembly line in accordance with a preferred embodiment of the present invention.
Figure 2A:
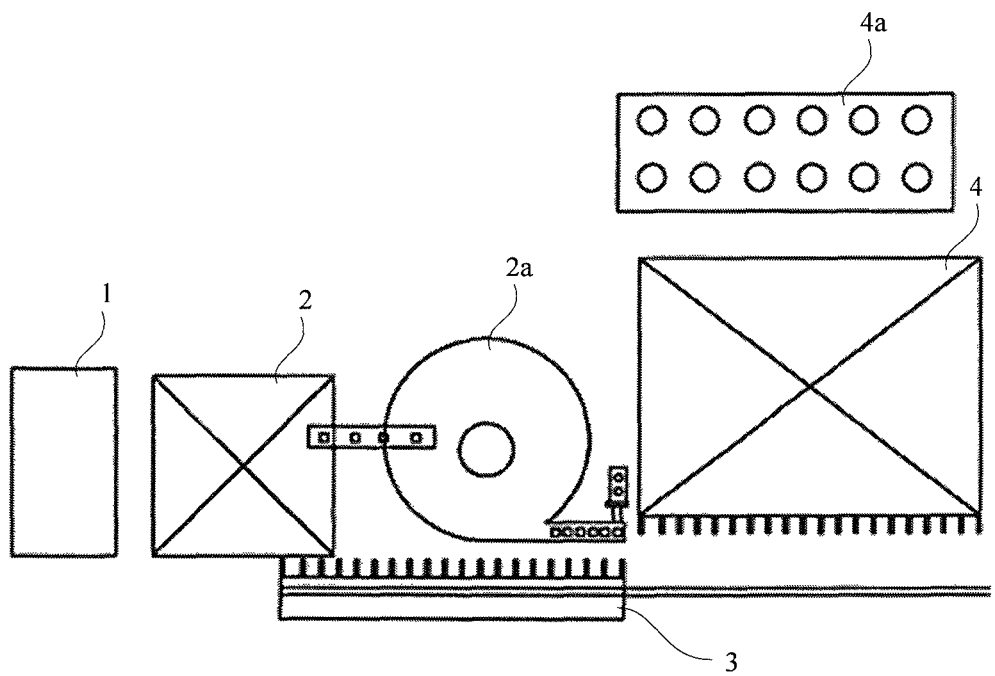
FIGS. 2A and 2B are fragmentally schematic views of first and second portions of a motor stator automatically assembling system in accordance with a preferred embodiment of the present invention.
Figure 2B:
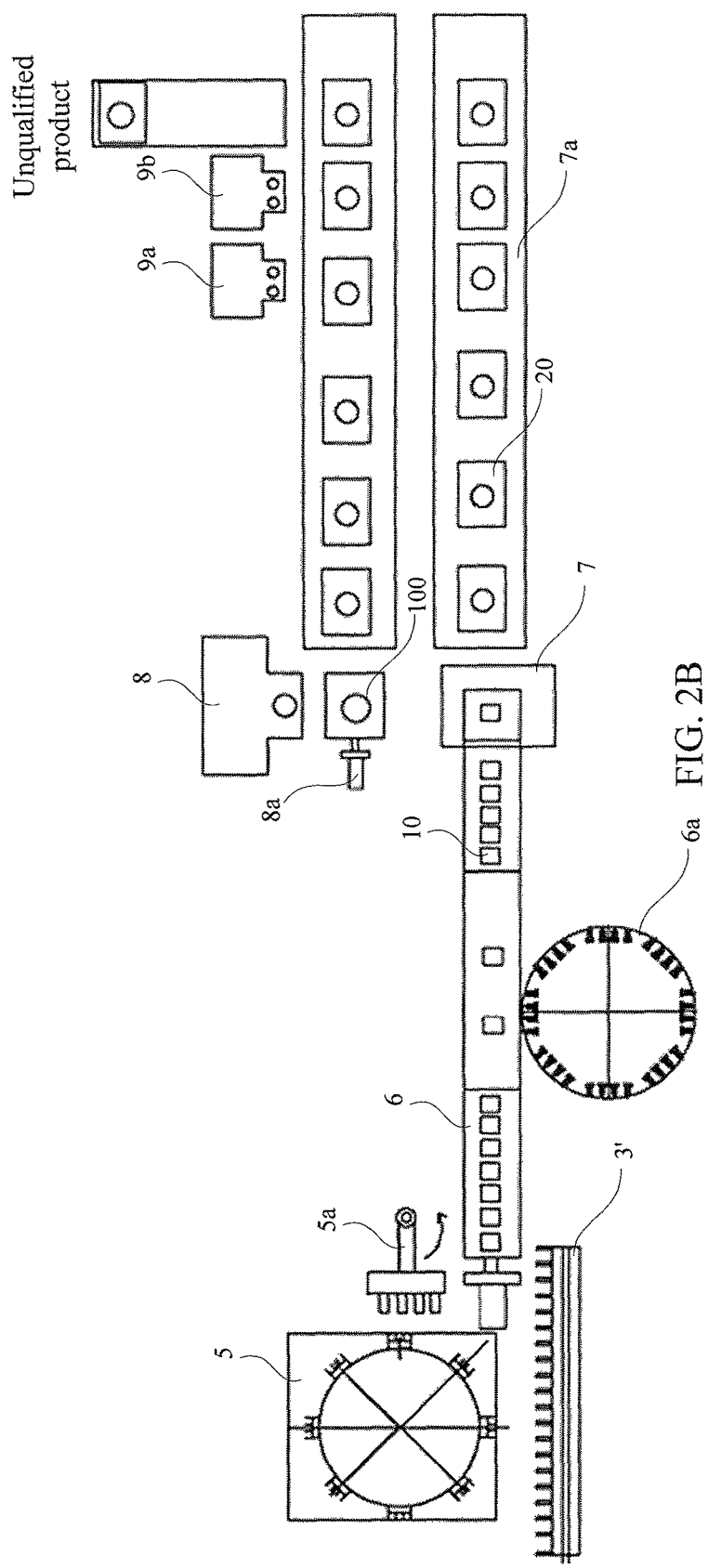
Figure 3:
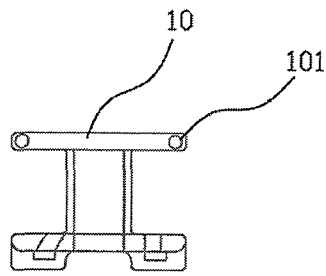
FIG. 3 is a schematic view of an insulation member applied in the present invention.

Referring to FIGS. 1, 1A, 2A and 2B, the motor stator automatically assembling method, as shown in FIG. 1, in accordance with a preferred embodiment of the present invention includes eight steps corresponding to the motor stator automatically assembling system, as best shown in FIGS. 2A and 2B, or the assembly line, as best shown in FIG. 1A. Turning now to FIG. 3, an isolation member or the like (e.g. isolation jacket or bobbin member) is applied to execute an automatically assembling method in accordance with the present invention.

Referring to FIGS. 1, 2A and 3, the motor stator automatically assembling method in accordance with the preferred embodiment of the present invention includes the step S1: automatically inserting at least one pin 101 in each predetermined side position of insulation members (e.g. isolation jacket) 10 by a pin insert unit (e.g. pin insert machine) 1, thereby automatically supplying the insulation members 10 therefrom. Each of the insulation members 10 has a central hole and a wire-winding recess formed therearound, as best shown in FIG. 3.

Still referring to FIGS. 1, 2A and 3, the motor stator automatically assembling method in accordance with the preferred embodiment of the present invention includes the step S2: automatically selecting and feeding the insulation members 10 by a feeder unit (e.g. feeder machine) 2 and a vibrator unit (e.g. vibrator machine) 2a connected therewith, thereby feeding the insulation members 10 into an assembly line and selecting the unqualified insulation members 10. The insulation members 10 received from the pin insert unit 1 are automatically conveyed by the feeder unit 2 to the vibrator unit 2a.

With continued reference to FIGS. 1, 2A and 3, the motor stator automatically assembling method in accordance with the preferred embodiment of the present invention includes the step S3: automatically supplying and arranging the insulation members 10 in order on a first conveyer unit (e.g. a pair of automatically reciprocated slides) 3 which is operated to automatically convey the insulation members 10 from the pin insert unit 1 or the vibrator unit 2a to an auto wire-winding unit (e.g. multi-winding machine) 4. By way of example, the insulation members 10 are automatically arranged in order on positioning seats of the first conveyer unit 3 and are further conveyed along a track to a predetermined position (e.g. the auto wire-winding unit 4) to process a procedure of wire-winding, soldering, testing and other processing.

Figure 4:
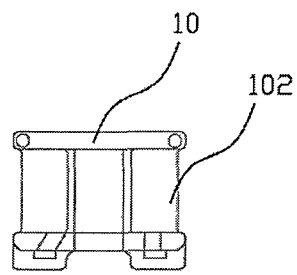
FIG. 4 is a schematic view of the wire-wound insulation member manufactured by the motor stator automatically assembling system and method in accordance with the preferred embodiment of the present invention.

FIG. 4 shows a schematic view of the wire-wound insulation member manufactured by the motor stator automatically assembling system and method, as best shown in FIGS. 1 and 2A, in accordance with the preferred embodiment of the present invention. Referring to FIGS. 1, 2A, 3 and 4, the motor stator automatically assembling method in accordance with the preferred embodiment of the present invention includes the step S4: automatically winding wires 102 on the wire-winding recesses of the associated insulation members 10 to form a plurality of wire-wound insulation members 10 with windings by the wire-winding unit 4. By way of example, a wire array seat 4a is provided with the wire-winding unit 4 to supply a plurality of the wires 102 thereto for a wire-winding operation.

With continued reference to FIGS. 1, 2A, 3 and 4, by way of example, while or after automatically winding the wires 102 on the insulation members 10, the wires 102 are further automatically wound on the associated pin 101 to electrically connect therewith. Accordingly, the entire wire-winding process shall be simplified by reducing a separate wire-winding or binding process of the wire 102 with the pin 101.

Turning now to FIGS. 2A and 2B, by way of example, the wire-wound insulation members 10 are automatically extracted from the wire-winding unit 4, as best shown in FIG. 2A, are arranged in order on positioning seats of a second conveyer unit 3' (or rearranged on the first conveyer unit 3) and are further conveyed along the track to a first testing equipment 5 or a predetermined position (e.g. auto soldering unit) to process a procedure of solder-paste-wetting, soldering or pin-bending. The first testing equipment 5 is used to execute an impedance or insulation test on the wire-wound insulation members 10.

Referring again to FIGS. 1, 2B and 4, the motor stator automatically assembling method in accordance with the preferred embodiment of the present invention includes the step S5: automatically supplying and arranging the wire-wound insulation members 10 on a third conveyer unit (e.g. conveyer belt) 6 which is operated to convey the wire-wound insulation members 10 to a first assembly unit 6a and a second assembly unit 7. By way of example, the wire-wound insulation members 10 are automatically extracted from the first testing equipment 5 by a manipulator unit 5a and are further deployed on the third conveyer unit 6 by an air piston. The third conveyer unit 6 further includes a vibrator unit operated to convey the wire-wound insulation members 10.

Figure 5:
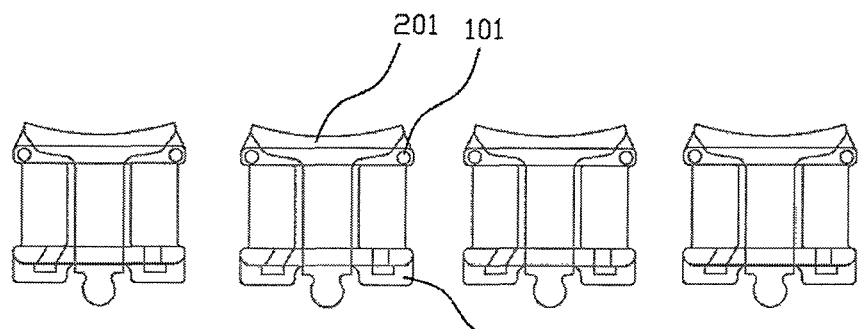
FIG. 5 is a schematic view of compact pole tooth sets assembled by the motor stator automatically assembling system and method in accordance with the preferred embodiment of the present invention.
Figure 5A:
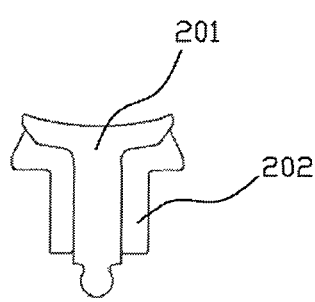
FIG. 5a is a schematic cross-sectional top view of a feed magazine and stacked pole teeth provided therein applied in the present invention.

FIGS. 5 and 5a are schematic views of compact pole tooth sets and stacked pole teeth provided in a feed magazine applied in the present invention. Referring to FIGS. 1, 2B, 5 and 5a, the motor stator automatically assembling method in accordance with the preferred embodiment of the present invention includes the step S6: automatically inserting a single pole tooth or stacked pole teeth 201 into the central holes of the wire-wound insulation members 10 in a manner of fitting to form a plurality of compact pole tooth sets by the first assembly unit 6a. Accordingly, after being assembled, the compact pole tooth sets are applied to generate magnetic fields to electrically drive a motor rotor, not shown in drawings. By way of example, each of the pole teeth 201 has a pole pillar, an engaging portion and a pole face, as best shown in FIG. 5a.

Referring again to FIGS. 1, 2B, 5 and 5a, by way of example, the first assembly unit 6a has eight or more sets of pole tooth storage units (e.g. feed magazine with magazine spring) 202 which are arranged in a circular member of the first assembly unit 6a. Each set has four pole tooth storage units 202 which are equi-spaced apart, as best shown in FIG. 2B. In the assembling operation, the pole teeth 201 are fittingly inserted into the central holes of the wire-wound insulation members 10.

Figure 6:
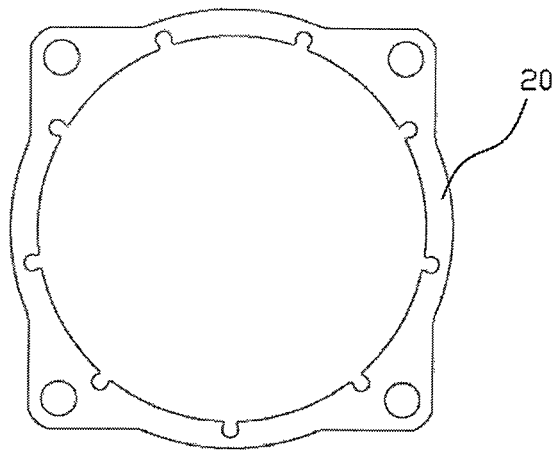
FIG. 6 is a schematic view of a stator ring frame applied in the present invention.
Figure 7:
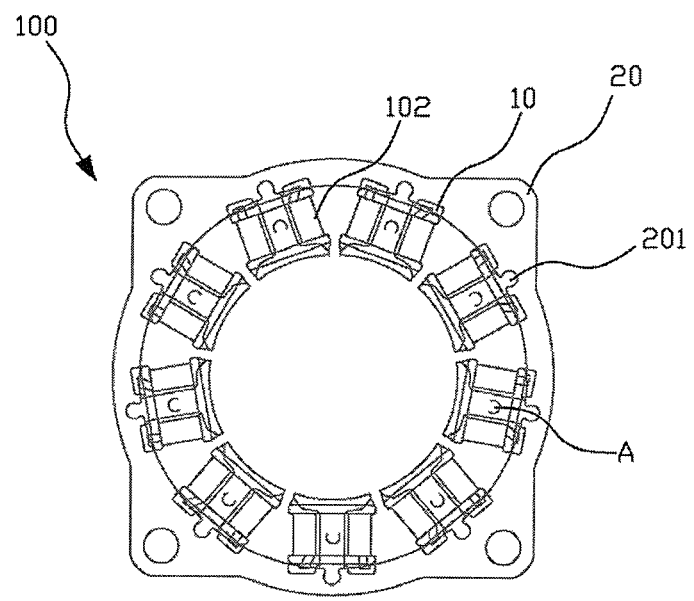
FIG. 7 is a schematic view of a semi-assembled motor stator assembled by the motor stator automatically assembling system and method in accordance with the preferred embodiment of the present invention.

FIG. 6 shows a schematic view of a stator ring frame applied in the present invention corresponding to the stator ring frames 20 shown in FIG. 2B. FIG. 7 shows a schematic view of a semi-assembled motor stator formed by the stator ring frame, as best shown in FIG. 6, in accordance with the preferred embodiment of the present invention. Referring again to FIGS. 1, 2B, 6 and 7, the motor stator automatically assembling method in accordance with the preferred embodiment of the present invention includes the step S7: automatically inserting at least one or a plurality of the compact pole tooth sets into the stator ring frame 20 to form a semi-assembled motor stator 100 by the second assembly unit 7. By way of example, the third conveyer unit 6 is provided to convey the compact pole tooth sets to the second assembly unit 7 or is selectively omitted.

With continued reference to FIG. 6, by way of example, the stator ring frame 20 can be selected from an outer stator ring frame or an inner stator ring frame. Furthermore, the second assembly unit 7 includes a fourth conveyer unit 7a which is operated to convey the stator ring frame 20 to the second assembly unit 7 or may be omitted. The second assembly unit 7 includes a rotary server unit (e.g. 12-station rotary server unit) which is applied to rotate the stator ring frame 20 for inserting each of the compact pole tooth sets into engaging portions of the stator ring frame 20.

Referring again to FIGS. 2B and 7, by way of example, the motor stator automatically assembling method in accordance with the alternative embodiment of the present invention further includes the step: automatically punching at least one surface of the semi-assembled motor stator 100 by a punch machine 8 to form a plurality of recessions "A" which are formed to combine the pole teeth 201 with each other or to combine the compact pole tooth sets with the stator ring frame 20 to reinforce the structure of the semi-assembled motor stator 100. The punch machine 8 further includes a rotary unit (e.g. manipulator) 8a which is applied to turn the semi-assembled motor stator 100 over for the punching operation.

Figure 8:
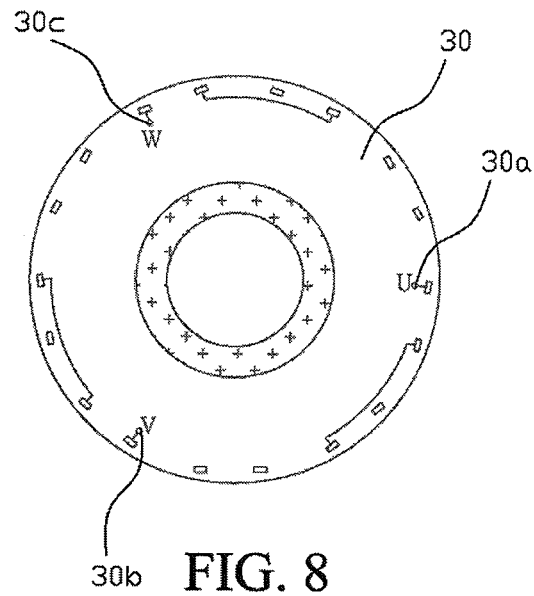
FIG. 8 is a schematic view of a printed circuit board applied in the present invention.
Figure 9:
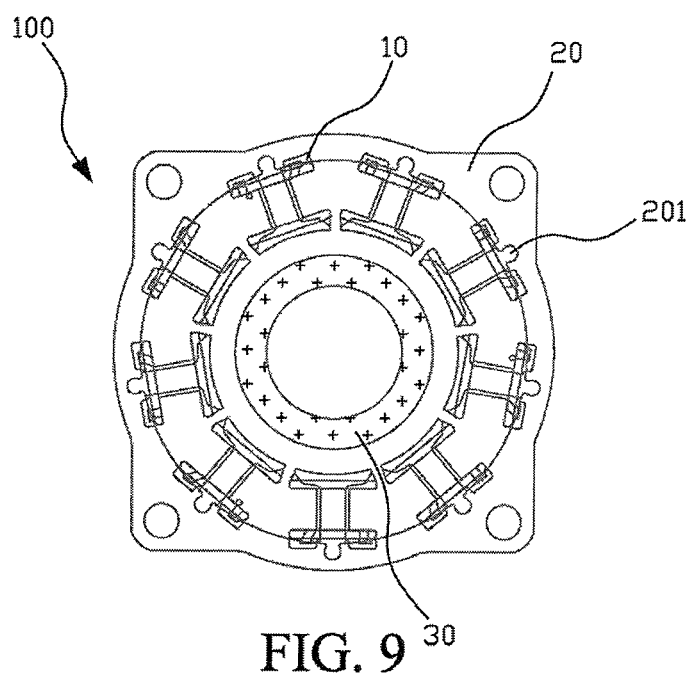
FIG. 9 is a schematic view of a complete-assembled motor stator manufactured by the motor stator automatically assembling system and method in accordance with the preferred embodiment of the present invention.

FIG. 8 shows a schematic view of a printed circuit board 30 attached to a side of the semi-assembled motor stator 100 shown in FIG. 7. FIG. 9 shows a schematic view of the printed circuit board 30, as best shown in FIG. 8, attached to a side of the semi-assembled motor stator 100, as best shown in FIG. 7, to form a complete-assembled motor stator in accordance with the preferred embodiment of the present invention. Referring again to FIGS. 1, 2B, 8 and 9, the motor stator automatically assembling method in accordance with the preferred embodiment of the present invention further includes the step S8: automatically combining the printed circuit board 30 with the semi-assembled motor stator 100 by an auto holder unit (e.g. manipulator) 9a to form a complete-assembled motor stator. In a preferred embodiment, the pins 101 of the semi-assembled motor stator 100, as best shown in FIG. 3, are inserted into via holes of the printed circuit board 30, and the pins are further bent and moistened with solder paste for soldering the semi-assembled motor stator 100 with the printed circuit board 30. By way of example, the printed circuit board 30 includes a plurality of contact points, including a first phase (U phase) contact point 30a, a second phase (V phase) contact point 30b and a third phase (W phase) contact point 30c. In order to improve the assembling operation, the contact points of U, V and W phases are provided with assembly marks shown as "U", "V" and "W" on the printed circuit board 30 for perfect alignment.

Referring again to FIGS. 1, 2B and 9, the motor stator automatically assembling method in accordance with the alternative embodiment of the present invention further includes the step: automatically executing a power test, a resistance test, a dielectric withstand voltage test, an insulation shock test or a load test on the motor stator 100 completely assembled by a second test equipment 9b. Accordingly, the motor stators 100 completely assembled are separated into two lines on which to convey qualified stator products and unqualified stator products.

Referring again to FIGS. 2A and 2B, the motor stator automatically assembling system in accordance with the preferred embodiment of the present invention selectively includes the pin insert unit 1, the feeder unit 2, the wire-winding unit 4, the first assembly unit 6a and the second assembly unit 7. In an alternative embodiment, the motor stator automatically assembling system further includes the vibrator unit 2a, the first conveyer unit 3, the second conveyer unit 3', the third conveyer unit, the fourth conveyer unit 7a, the punch machine 8, the rotary unit 8a, the first testing equipment 5, the second test equipment 9b, the auto holder unit 9a or other equipment.

With continued reference to FIGS. 2A and 2B, the first conveyer unit 3 connects to the feeder unit 2 and the wire-winding unit 4 connects to the first conveyer unit 3. Furthermore, the second conveyer unit 3' connects to the wire-winding unit 4, and the first assembly unit 6a connects to the second assembly unit 7 to form an assembly line.

Figure 10:
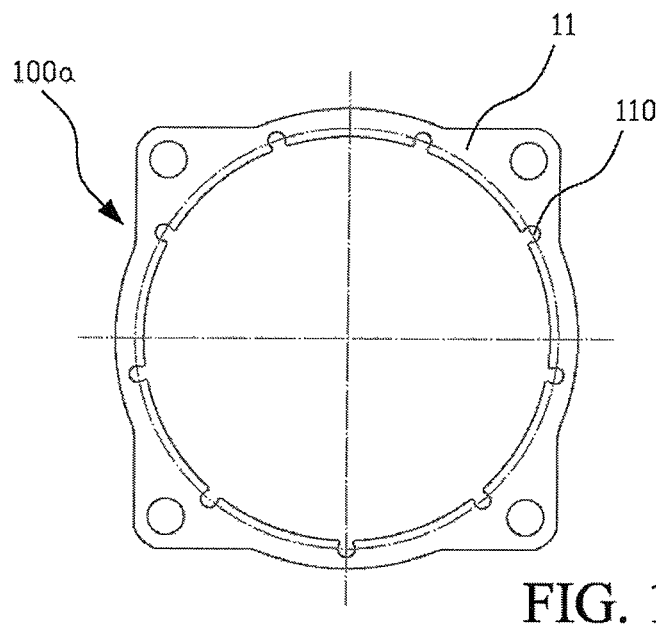
FIGS. 10 and 11 are schematic views of an outer stator ring frame and pole tooth units applied in a DC three-phase motor structure or an AC three-phase motor structure in accordance with the preferred embodiment of the present invention.
Figure 11:
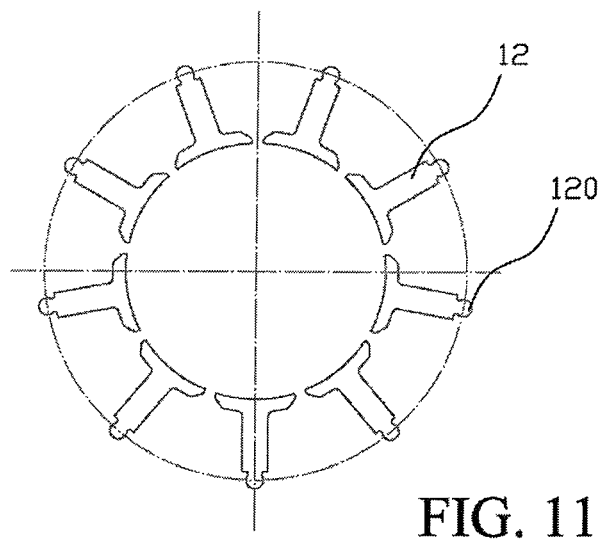

Referring to FIGS. 10 and 11, the three-phase motor structure includes a sectional stator 100a having an outer stator ring frame 11 and a series of pole tooth units 12. The outer stator ring frame 11 and the pole tooth units 12 are made of magnetically conductive materials or other similar materials, for example: silicon steel plates. The outer stator ring frame 11 has an inner circumferential flange (dotted line in FIG. 10) surrounding a longitudinal axis to form an axial hole. The inner flange of the outer stator ring frame 11 corresponds to the pole tooth units 12, so that the outer stator ring frame 11 and the pole tooth units 12 are assembled to form the sectional stator 100a.

Figure 12:
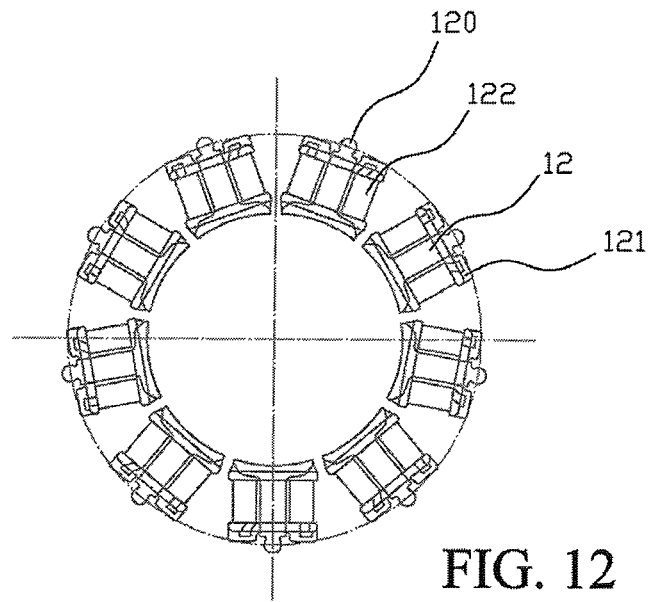
FIG. 12 is a schematic view of the pole tooth units combined with isolation jackets applied in the present invention.
Figure 13:
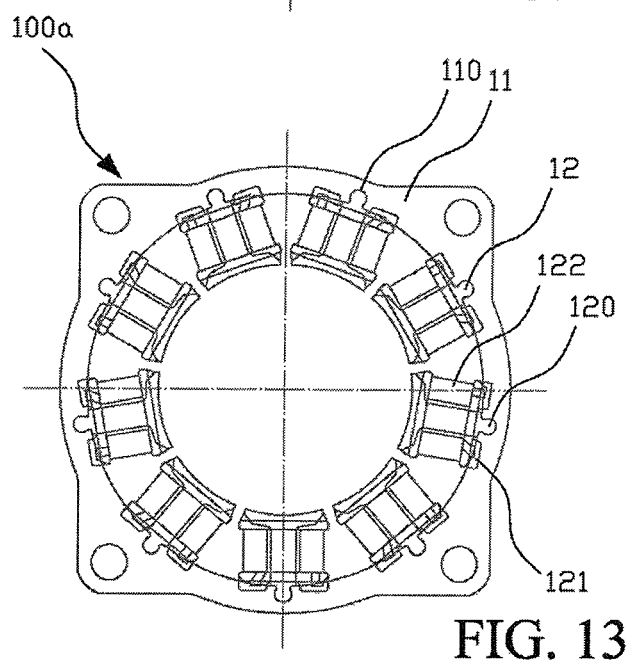
FIG. 13 is a schematic view of the pole tooth units engaged with the outer stator ring frame applied in the present invention.

Turning now to FIGS. 11 and 12, the pole tooth units 12 are detachable from the outer stator ring frame 11 for disassembly and include a plurality of pole teeth, for example: 9 pole teeth. When assembled, the pole tooth units 12 are deployed along the inner flange of the outer stator ring frame 11 and are equi-spaced apart. Each of the pole tooth units 12 has an outer flange (dotted line in FIG. 11) located on the pole tooth. The outer flange of the pole tooth unit 12 corresponds to the inner flange of the outer stator ring frame 11. Furthermore, each pole tooth of the pole tooth units 12 has an inner pole face with respect to the longitudinal axis.

With continued reference to FIGS. 11 and 12, the pole tooth units 12 include an isolation device 121 and a winding set 122, and the isolation device 121 is provided between the winding set 122 and the pole teeth. In addition, the isolation device 121 includes a plurality of isolation jackets, while the winding set 122 includes a plurality of wire windings and a plurality of wire connection ends, as best shown in FIG. 12, such that each pole tooth is provided with at least one isolation jacket and at least one wire winding. Prior to assembling or reassembling the sectional stator 100a, the winding set 122 is wound on each pole teeth of the pole tooth units 12 by a wire winding machine, and, subsequently, the isolation device 121 is further formed on the pole tooth units 12 to speed the wire winding process (entire assembling or reassembling process).

Turning now to FIGS. 10 through 13, in assembling or reassembling, each outer flange of the pole tooth units 12 is correspondingly engaged with the inner flange of the outer stator ring frame 11 by magnetic conductive material (paste), for example. The outer stator ring frame 11 includes at least one first engaging portion 110, while the pole tooth units 12 include at least one second engaging portion 120 to engage with the first engaging portion 110. Preferably, the first engaging portion 110 is provided on the inner flange of the outer stator ring frame 11, and the second engaging portion 120 is provided on the outer flanges of the pole tooth units 12.

Referring again to FIGS. 10 and 13, the first engaging portion 110 is selected from a recession, while the second engaging portion 120 is selected from a protrusion. In an alternative embodiment, the first engaging portion 110 is selected from a protrusion, while the second engaging portion 120 is selected from a recession.

Figure 14:
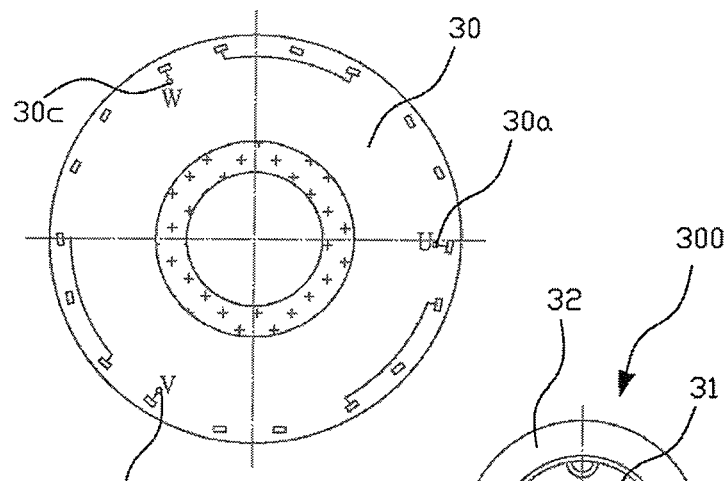
FIGS. 14 and 15 are schematic views of a printed circuit board and an inner rotor core applied in the present invention.

Turning now to FIG. 14, the three-phase motor structure further includes a printed circuit board 30 including a plurality of contact points to correspondingly connect with the wire connection ends of the winding set 122. By way of example, the contact points include a first phase (U phase) contact point 30a, a second phase (V phase) contact point 30b and a third phase (W phase) contact point 30c. In assembling or reassembling, the contact points are correspondingly connected with the wire connection ends of the winding set 122 by welding, for example.

Figure 15:
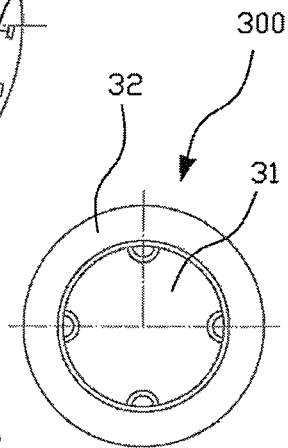

Turning now to FIG. 15, the three-phase motor structure further includes an inner rotor core 300 comprised of a rotor 31 and a magnet 32. In assembling or reassembling, the inner rotor core 300 extends through the sectional stator 100a, such that the inner pole faces of the pole tooth units 12 correspond to the magnet 32 for driving the motor.

Figure 16:
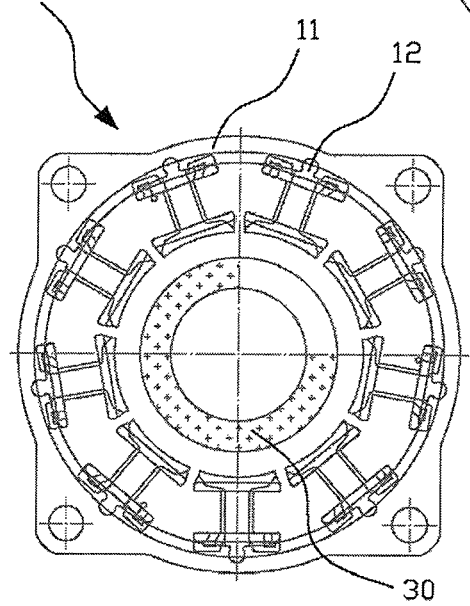
FIG. 16 is a schematic view of a sectional stator of the present invention.

Turning now to FIG. 16, after the sectional stator 100a is assembled, the printed circuit board 30 is further attached to a side of the sectional stator 100a and electrically connects therewith. In order to improve the assembling or reassembling operation, the contact points of U, V and W phases are provided with assembling marks shown as "U", "V" and "W" on the printed circuit board 30 for perfect alignment.

Figure 17:
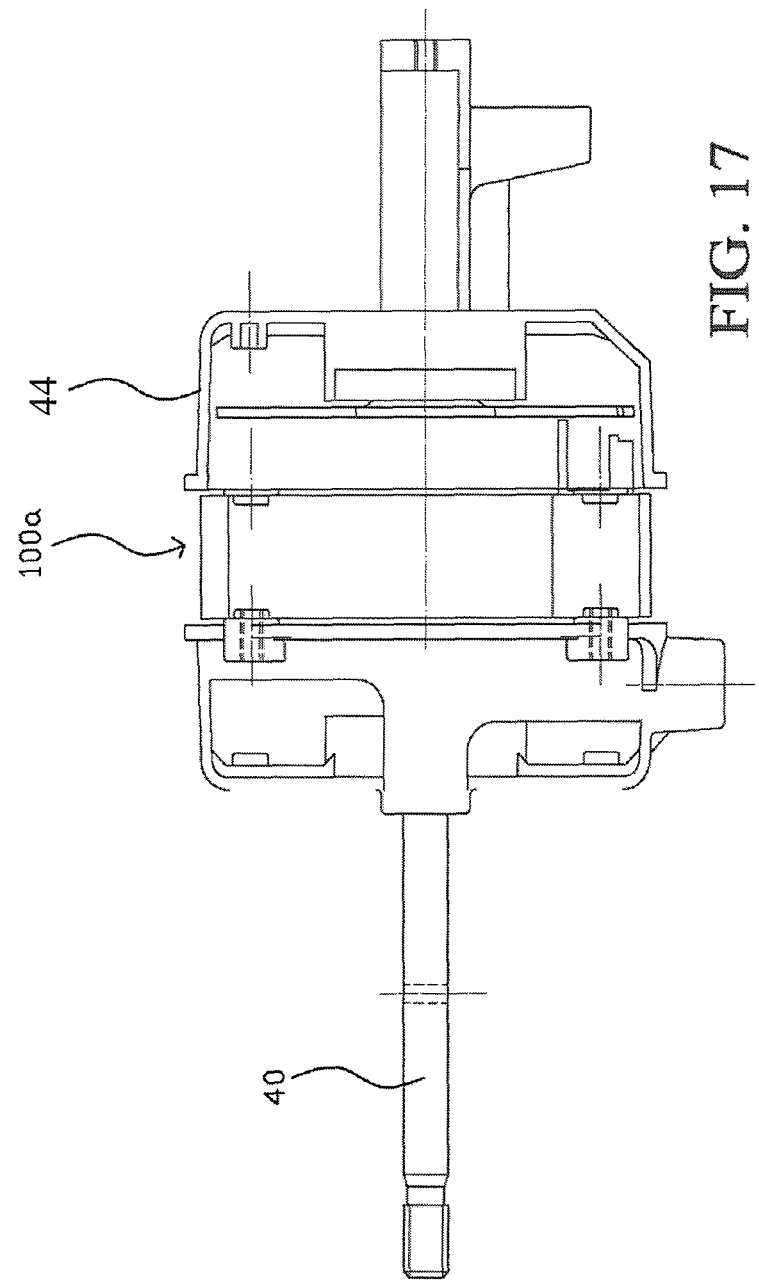
FIG. 17 is a sectional view of the three-phase motor structure of the present invention.

Turning now to FIG. 17, the combined structure of the sectional stator 100a, the printed circuit board 30 and the inner rotor core 300 is provided in a housing 44. When the sectional stator 100a is operated to drive the inner rotor core 300, an axis 40 combined with the inner rotor core 300 rotates synchronously. The housing 44 can be achieved in the known manner so that the detailed descriptions may be omitted.

Figure 18:
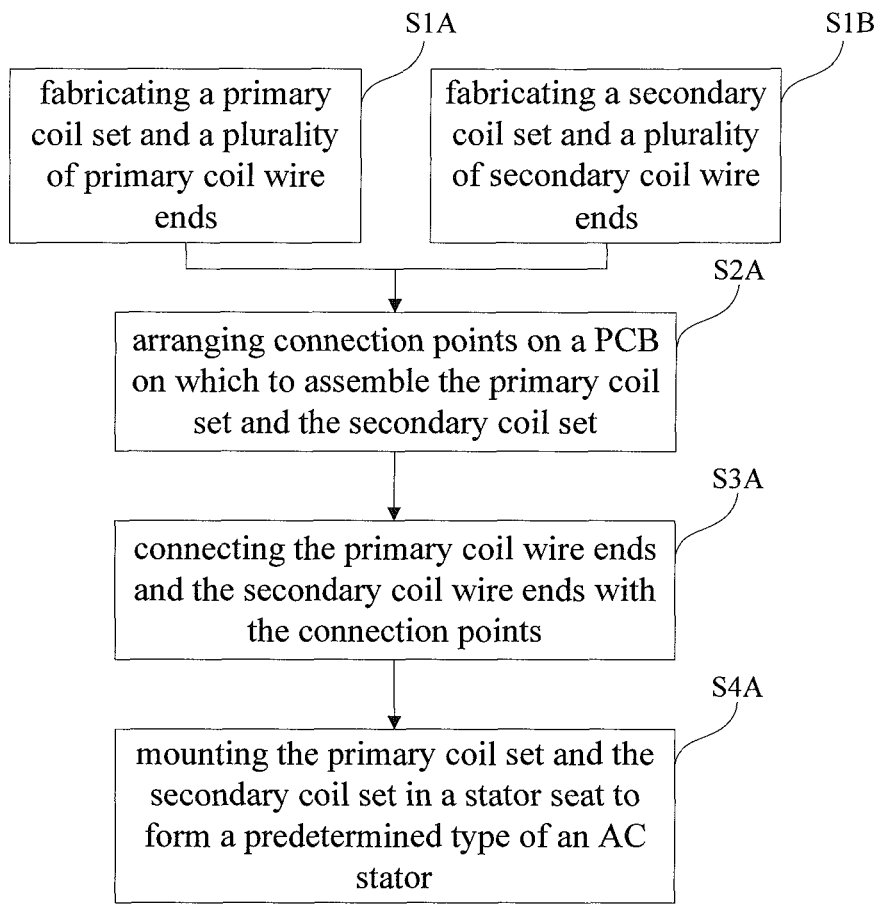
FIG. 18 is a block diagram of a manufacturing method of the motor stator in accordance with a first preferred embodiment of the present invention.
Figure 19:
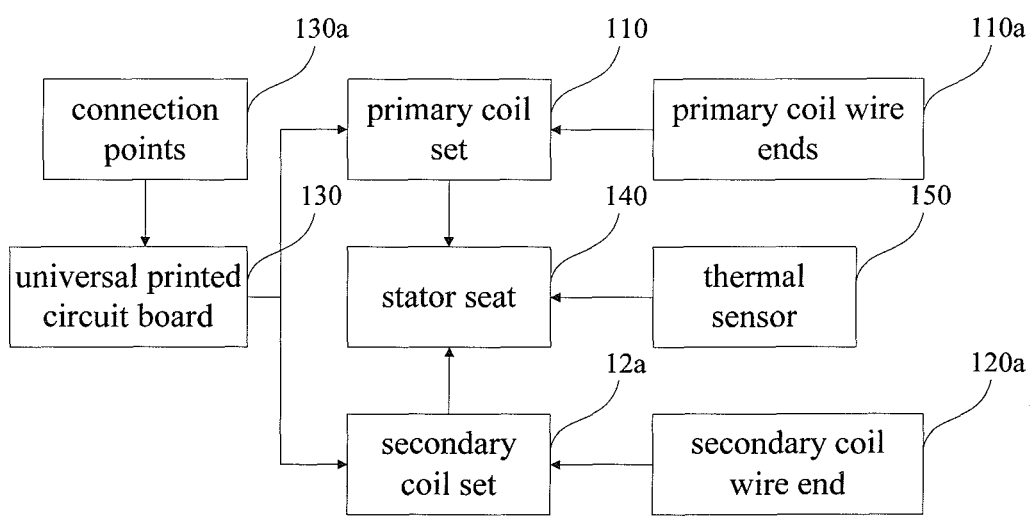
FIG. 19 is a block diagram of the motor stator structure in accordance with a preferred embodiment of the present invention.

FIG. 18 shows a block diagram of a manufacturing method of the motor stator in accordance with a first preferred embodiment of the present invention. FIG. 19 shows a block diagram of the motor stator structure in accordance with a preferred embodiment of the present invention. Turning now to FIGS. 18 and 19, the motor stator structure in accordance with a preferred embodiment of the present invention is selected from a motor stator or an AC motor stator, including a primary coil set 110, a plurality of primary coil wire ends 110a, secondary coil sets 12a, a plurality of secondary coil wire ends 120a, a universal printed circuit board 130, a plurality of connection points 130a, a stator seat 140 and a thermal sensor 150. The primary coil set 110, the secondary coil sets 12a, the universal printed circuit board 130 and the thermal sensor 150 are provided on the stator seat 140.

Still referring to FIGS. 18 and 19, the motor stator manufacturing method in accordance with the first embodiment includes the step S1A: prefabricating the (separate detachable) primary coil set 110 and a plurality of the primary coil wire ends 110a thereof. The primary coil wire ends 110a are provided on a predetermined position of the primary coil set 110. By way of example, the primary coil set 110 has an end surface or other suitable surface on which to protrude the primary coil wire ends 110a. The primary coil set 110 is formed from separate detachable pole tooth sets with windings. The primary coil wire ends 110a include start ends and terminal ends opposite to the start ends.

Still referring to FIGS. 18 and 19, the motor stator manufacturing method in accordance with the first embodiment includes the step S1B: prefabricating the (separate detachable) secondary coil sets 12a and a plurality of the secondary coil wire ends 120a thereof. The secondary coil wire ends 120a are provided on a predetermined position of the secondary coil sets 12a. By way of example, each secondary coil set 12a has an end surface or other suitable surface on which to protrude the secondary coil wire ends 120a. The secondary coil sets 12a are formed from separate detachable pole tooth sets with windings. The secondary coil wire ends 120a includes start ends and terminal ends opposite to the start ends.

Still referring to FIGS. 18 and 19, the motor stator manufacturing method in accordance with the first embodiment includes the step S2A: arranging the connection points 130a on the universal printed circuit board 130 on which to assemble or reassemble the primary coil set 110 and the secondary coil sets 12a by suitable manners, e.g.: automatic assembling and welding processes. Consequently, the primary coil set 110, the secondary coil sets 12a and the universal printed circuit board 130 are assembled to form an initial assembly structure.

Still referring to FIGS. 18 and 19, the connection points 130a are equi-spaced with respect to a center point on the universal printed circuit board 130. Layouts of the universal printed circuit board 130 can be selected, and numbers of the primary coil set 110 and the secondary coil sets 12a can be selectively adjusted for assembling or reassembling a predetermined design of various motor stator types.

Still referring to FIGS. 18 and 19, the motor stator manufacturing method in accordance with the first embodiment includes the step S3A: selectively connecting or reconnecting the primary coil wire ends 110a and the secondary coil wire ends 120a with the connection points 130a of the universal printed circuit board 130 to form or change into a predetermined design of various motor stator types by automatically welding, for example. Thus, the universal printed circuit board 130 electrically connects with the primary coil wire ends 110a and the secondary coil wire ends 120a, such that the primary coil set 110 and the secondary coil sets 12a can be controlled via the universal printed circuit board 130.

Still referring to FIGS. 18 and 19, the motor stator manufacturing method in accordance with the first embodiment includes the step S4A: mounting the primary coil set 110 and the secondary coil sets 12a in the stator seat 140 to form or change into a particular design of the AC motor stator type (e.g.: single phase AC motor stator or three phase AC motor stator) for flexible design.

Figure 20:
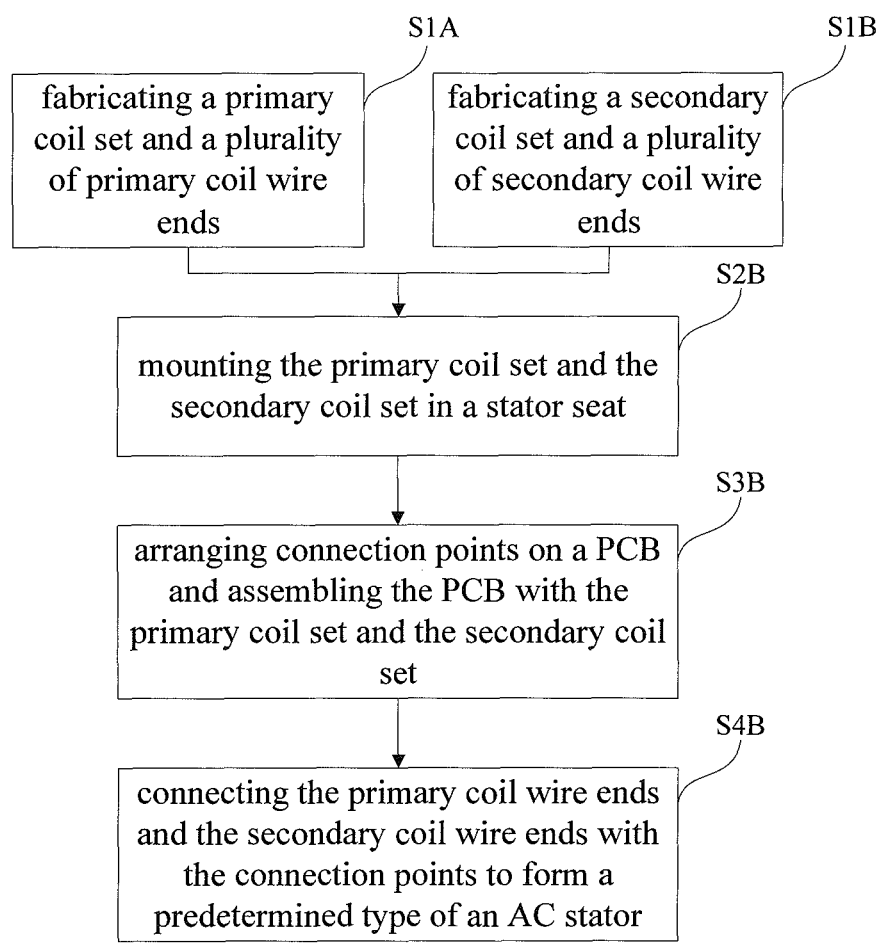
FIG. 20 is a block diagram of a manufacturing method of the motor stator in accordance with a second preferred embodiment of the present invention.

FIG. 20 shows a block diagram of a manufacturing method of the motor stator, similar to that in FIG. 18, in accordance with a second preferred embodiment of the present invention. A sequence of steps S1A, S1B, S2B, S3B and S4B of the second preferred embodiment of the present invention is adjustably changed or other steps added according to need.

Referring to FIGS. 19 and 20, the motor stator manufacturing method in accordance with the second embodiment includes the step S1A: prefabricating the (separate detachable) primary coil set 110 and a plurality of the primary coil wire ends 110a thereof. The primary coil wire ends 110a are provided on a predetermined position of the primary coil set 110. By way of example, the primary coil set 110 has a winding type including a series of single primary windings.

Figure 21:
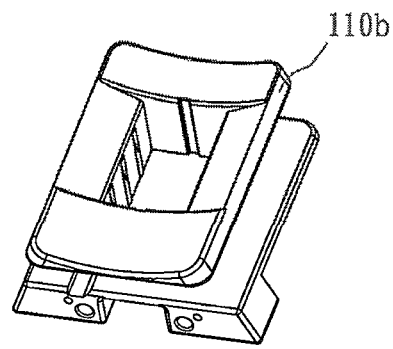
FIG. 21 is a perspective view of an isolation jacket structure of a primary coil set applied in the motor stator in accordance with the present invention.

FIG. 21 shows a perspective view of an isolation jacket structure (or bobbin) of a primary coil set applied in the motor stator in accordance with the present invention. Referring now to FIGS. 19 and 21, the primary coil set 110 further includes a first isolation jacket structure 110b which has an inner circumferential wall and an outer circumferential wall corresponding to the inner circumferential wall. The inner circumferential wall is formed with a compartment, an assembling opening and a pair of positioning plates and contains a pole tooth iron core or the like. The inner circumferential wall further includes at least one engaging rib and at least one guiding groove extending along a longitudinal direction. The outer circumferential wall is provided to receive at least one winding. The outer circumferential wall includes a pair of sidewalls to contain and isolate the winding.

Figure 22:
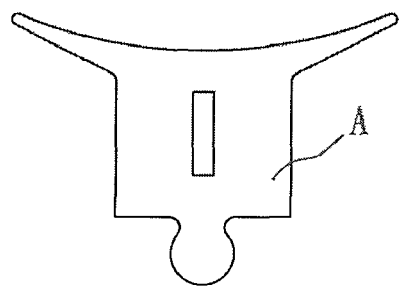
FIG. 22 is a schematic front view of a pole tooth structure applied in the motor stator in accordance with the present invention.

FIG. 22 shows a schematic front view of a pole tooth structure applied in the motor stator in accordance with the present invention. Referring to FIGS. 19, 21 and 22, a pole tooth iron core "A" extends through the first isolation jacket structure 110b of the primary coil set 110 and is tightly engaged with the compartment, the assembling opening and the positioning plates.

Referring to FIGS. 19, 20 and 21, the motor stator manufacturing method in accordance with the second embodiment includes the step S1B: prefabricating the (separate detachable) secondary coil sets 12a and a plurality of the secondary coil wire ends 120a thereof. The secondary coil wire ends 120a are provided on a predetermined position of the secondary coil sets 12a. By way of example, each secondary coil set 12a has a winding type including a series of single secondary windings.

Figure 21A:
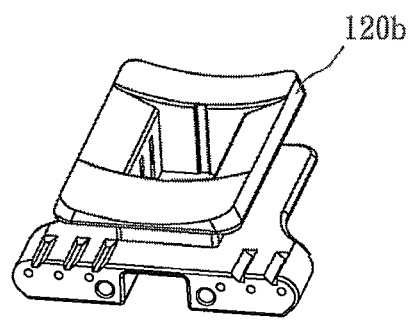
FIG. 21A is a perspective view of an isolation jacket structure of a secondary coil set applied in the motor stator in accordance with the present invention.

FIG. 21A shows a perspective view of an isolation jacket structure of a secondary coil set, similar to that in FIG. 21, applied in the motor stator in accordance with the present invention. Referring now to FIGS. 19 and 21A, each secondary coil set 12a further includes include a second isolation jacket structure 120b which also has an inner circumferential wall and an outer circumferential wall corresponding to the inner circumferential wall. The inner circumferential wall is formed with a compartment, an assembling opening and a pair of positioning plates and contains a pole tooth iron core or the like. The inner circumferential wall further includes at least one engaging rib and at least one guiding groove extending along a longitudinal direction. The outer circumferential wall is provided to receive at least one winding. The outer circumferential wall includes a pair of sidewalls to contain and isolate the winding.

Referring again to FIGS. 21A and 22, the pole tooth iron core "A" extends through the second isolation jacket structure 120b of the secondary coil sets 12a along the guiding groove and is tightly engaged with the compartment, the assembling opening and the positioning plates by the engaging rib or the like.

By way of example, each secondary coil set 12a has a winding type including a series of single secondary windings for manufacturing a single phase AC motor stator. In a preferred embodiment, each secondary coil set 12a has another winding type including a series of multiple secondary windings for manufacturing a three phase AC motor stator. Each of the multiple secondary windings has a predetermined ratio with respect to each of the single secondary windings.

Referring to FIGS. 19, 20 and 21A, the motor stator manufacturing method in accordance with the second embodiment includes the step S2B: mounting the primary coil set 110 and the secondary coil sets 12a in the stator seat 140 to form another design of the initial assembly structure in the assembling or reassembling process.

Referring to FIGS. 19, 20 and 21A, the motor stator manufacturing method in accordance with the second embodiment includes the step S2: mounting the primary coil set 110 and the secondary coil set 120 in the stator seat 130 to form another design of the initial assembly structure in the assembling or reassembling process.

Figure 23:
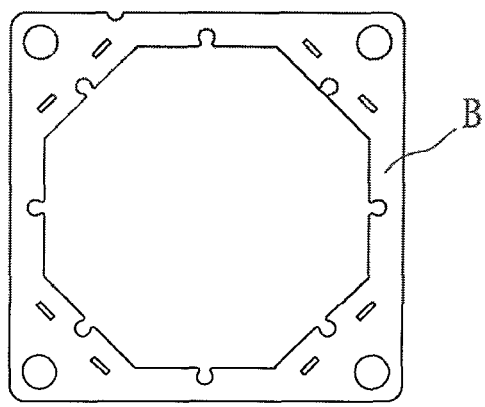
FIG. 23 is a schematic front view of an outer ring frame structure applied in the motor stator in accordance with the present invention.

FIG. 23 shows a schematic front view of an outer ring frame structure applied in the motor stator in accordance with the present invention. Referring again to FIGS. 21, 21A, 22 and 23, the stator seat 140 includes one or a plurality of outer stator ring frames "B". The outer stator ring frame "B" is detachably combined with a number of the pole tooth iron cores "A", as best shown in FIG. 23, in the assembling or reassembling process. The outer stator ring frame "B" has an inner circumferential edge which is detachably engaged with an outer circumferential edge of each of the pole tooth iron cores "A". In addition, a magnetic conductive material (or paste) is provided between the inner circumferential edge of the outer stator ring frame "B" and the outer circumferential edge of the pole tooth iron core "A" in the assembling or reassembling process for maintenance.

Referring again to FIGS. 19 and 20, the motor stator manufacturing method in accordance with the second embodiment includes the step S3B: arranging the connection points 130a on the universal printed circuit board 130 and assembling or reassembling the universal printed circuit board 140 with the primary coil set 110 and the secondary coil sets 12a of the initial assembly structure by an automatically assembling process.

FIG. 24 shows a schematic circuitry view of the primary coil set and the secondary coil sets applied in the motor stator in accordance with the present invention corresponding to those in FIG. 18. Referring to FIGS. 18 and 24, the primary coil set 110 and the secondary coil sets 12a are selectively arranged in a motor stator circuitry shown in FIG. 24. Each secondary coil sets 12a includes three secondary windings or other number of secondary windings.

Figure 24A:
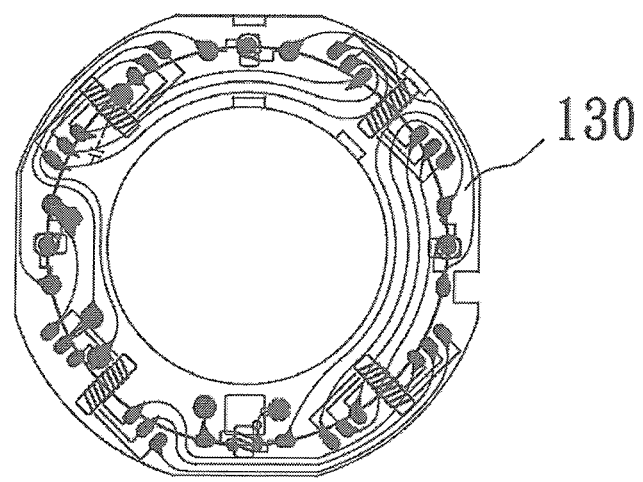
FIG. 24A is a schematic view of a printed circuit board structure applied in the motor stator in accordance with the present invention.

FIG. 24A shows a schematic view of a printed circuit board structure applied in the motor stator in accordance with the present invention corresponding to the motor stator circuitry in FIG. 24. Referring to FIGS. 19, 24 and 24A, the universal printed circuit board 130 electrically connects with the primary coil set 110 and the secondary coil sets 12a. The universal printed circuit board 130 is selected from a flexible printed circuit board, a multi-layer printed circuit board, a sectional printed circuit board or other types of the printed circuit boards.

Referring again to FIGS. 19 and 20, the motor stator manufacturing method in accordance with the second embodiment includes the step S4B: selectively connecting or reconnecting the primary coil wire ends 110a and the secondary coil wire ends 120a with the connection points 130a of the universal printed circuit board 130 to form or change into a predetermined design of various motor stator types.

Figure 25:
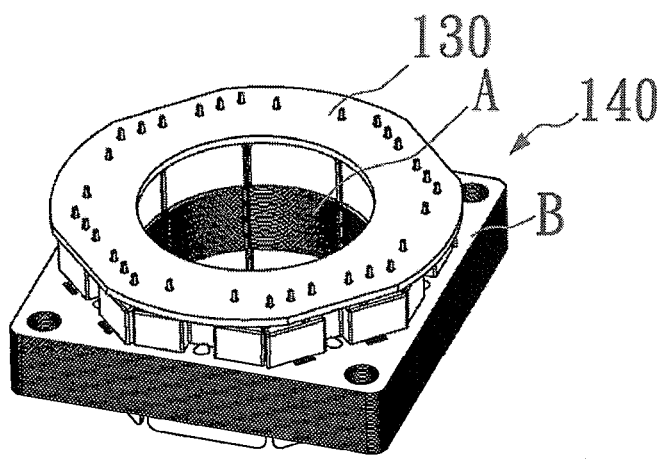
FIG. 25 is a perspective view of the motor stator structure in accordance with the present invention.
Figure 25A:
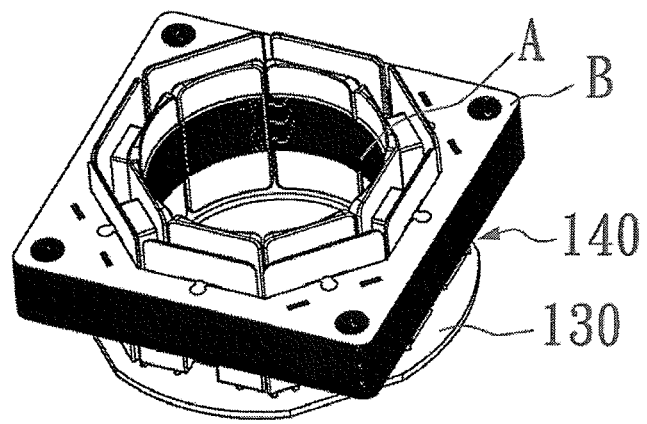
FIG. 25A is another perspective view of the motor stator structure in accordance with the present invention.
Figure 25B:
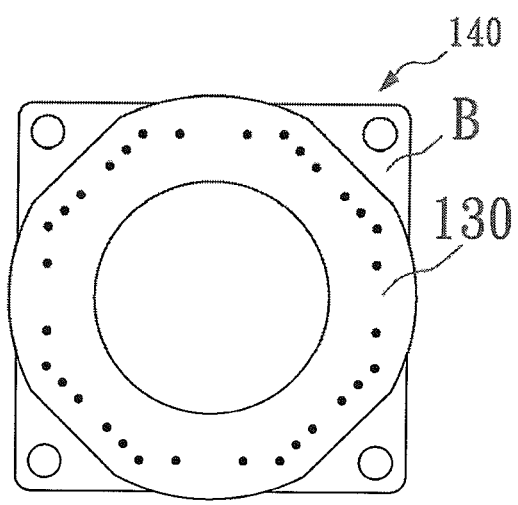
FIG. 25B is a front view of the motor stator structure in accordance with the present invention.
Figure 25C:
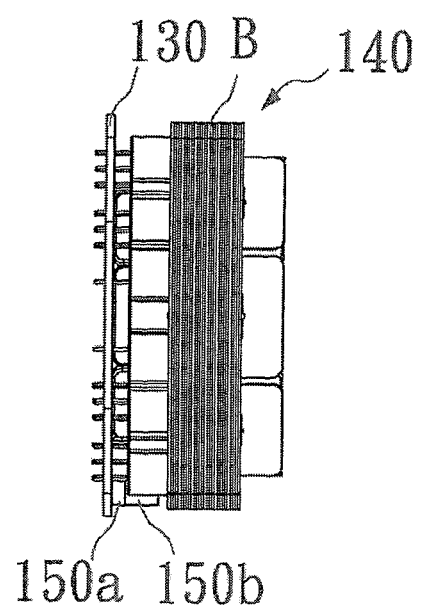
FIG. 25C is a side view of the motor stator structure in accordance with the present invention.

FIGS. 25 and 25A show two perspective views of the motor stator structure in accordance with the present invention. FIG. 25B shows a front view of the motor stator structure, shown in FIGS. 25 and 25A, in accordance with the present invention. FIG. 25C shows a side view of the motor stator structure, shown in FIGS. 25 and 25A, in accordance with the present invention. Referring to FIGS. 19, 20, 23 and 25-25C, the primary coil set 110 and the secondary coil sets 12a are equi-spaced on the outer stator ring frame "B" of the stator seat 140, and the universal printed circuit board 130 is attached to one side of the outer stator ring frame "B". In a preferred embodiment, the two universal printed circuit boards 130 are attached to both sides of the outer stator ring frame "B".

With continued reference to FIGS. 19, 20, 22, 23 and 25-25C, the primary coil set 110 and the secondary coil sets 12a are extended beyond opposite side surfaces of the outer stator ring frame "B" of the stator seat 140 to reduce the dimensions. Furthermore, the sidewalls extended from the outer circumferential wall of the isolation jacket structure contain and isolate the windings to enhance the permeability of the pole tooth iron cores "A".

Referring again to FIGS. 19 and 25C, the thermal sensor 150 includes a thermal sensing portion 150a and a thermal conductive portion 150b which are assembled on the universal printed circuit board 130 by a suitable manner for detecting a temperature of the motor stator. When the temperature of the motor stator exceeds a predetermined value, the power of the motor stator is cut off to avoid overheating for enhancing operational safety.

With continued reference to FIGS. 19 and 25C, the thermal sensing portion 150a includes a first end and a second end, while the thermal conductive portion 150b includes a first end and a second end. The first end of the thermal sensing portion 150a connects with the universal printed circuit board 130, and the second end of the thermal sensing portion 150a connects with the first end of the thermal conductive portion 150b. The second end of the thermal conductive portion 150b further connects with one of the primary coil set 110 and the secondary coil sets 12a.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A motor stator manufacturing method comprising:
   prefabricating a plurality of first separate detachable coil sets and a plurality of second separate detachable coil sets and coil wire ends thereof;
   arranging connection points on a printed circuit board on which to assemble or reassemble the plurality of first separate detachable coil sets and the plurality of second separate detachable coil sets;
   selectively connecting or reconnecting the coil wire ends with the connection points of the printed circuit board to form or change into a predetermined design of various motor stator types; and
   mounting the plurality of separate detachable coil sets and the plurality of second separate detachable coil sets in a stator seat to form or change into the AC motor stator type;
   wherein a first single winding is formed on first pole teeth of each of the plurality of first separate detachable coil sets and a plurality of second windings is formed on second pole teeth of each of the plurality of second separate detachable coil sets prior to being assembled or reassembled;
   wherein the plurality of first separate detachable coil sets is arranged to form a primary coil set and the plurality of second separate detachable coil sets is arranged to form a plurality of secondary coil sets to form an AC motor stator;
   wherein the primary coil set is a single primary coil formed by connecting each first single winding, with each of the first pole teeth having the first single winding; and
   wherein the plurality of secondary coil sets includes a plurality of secondary coils formed by connecting the plurality of second windings, with each of the second pole teeth having the plurality of second windings, wherein each secondary coil set includes a high secondary coil set, a middle secondary coil set and a lower secondary coil set to form a variably controllable motor stator.

2. The motor stator manufacturing method as defined in claim 1, wherein the stator seat has an inner circumferential edge to combine with the plurality of first and second separate detachable coil sets.

3. The motor stator manufacturing method as defined in claim 1, wherein the coil wire ends include a plurality of primary coil wire ends and a plurality of secondary coil wire ends.

4. The motor stator manufacturing method as defined in claim 1, wherein the coil wire ends include a plurality of starting ends and a plurality of terminal ends.

5. A motor stator manufacturing method comprising:
prefabricating a plurality of first separate detachable coil sets and a plurality of second separate detachable coil sets and coil wire ends thereof;
mounting the plurality of first separate detachable coil sets and the plurality of second separate detachable coil sets in a stator seat;
arranging connection points on a printed circuit board and assembling or reassembling the printed circuit board with the plurality of first separate detachable coil sets and the plurality of second separate detachable coil sets; and
selectively connecting or reconnecting the coil wire ends with the connection points of the printed circuit board to form or change into a predetermined design of various motor stator types;
wherein a first single winding is formed on first pole teeth of each of the plurality of first separate detachable coil sets and a plurality of second windings is formed on second pole tooth of each of the plurality of second separate detachable coil sets prior to being assembled or reassembled;
wherein the plurality of first separate detachable coil sets is arranged to form a primary coil set and the plurality of second separate detachable coil sets is arranged to form a plurality of secondary coil sets to form an AC motor stator;
wherein the primary coil set is a single primary coil formed by connecting each first single winding, with each of the first pole teeth having the first single winding; and
wherein the plurality of secondary coil sets includes a plurality of secondary coils formed by connecting the plurality of second windings, with each of the second pole teeth having the plurality of second windings, wherein each secondary coil set includes a high secondary coil set, a middle secondary coil set and a lower secondary coil set to form a variably controllable motor stator.

6. The motor stator manufacturing method as defined in claim 5, wherein the stator seat has an inner circumferential edge to combine with the plurality of first and second separate detachable coil sets.

7. The motor stator manufacturing method as defined in claim 5, wherein the coil wire ends include a plurality of primary coil wire ends and a plurality of secondary coil wire ends.

8. The motor stator manufacturing method as defined in claim 5, wherein the coil wire ends include a plurality of starting ends and a plurality of terminal ends.

* * * * *